United States Patent
Zhang et al.

(10) Patent No.: US 11,704,813 B2
(45) Date of Patent: Jul. 18, 2023

(54) VISUAL SEARCH METHOD, VISUAL SEARCH DEVICE AND ELECTRICAL DEVICE

(71) Applicant: Baidu Online Network Technology (Beijing) Co., Ltd., Beijing (CN)

(72) Inventors: Liuqing Zhang, Beijing (CN); Guohong Li, Beijing (CN); Yongjia Yu, Beijing (CN); Xin Qiu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 128 days.

(21) Appl. No.: 16/871,206

(22) Filed: May 11, 2020

(65) Prior Publication Data
US 2021/0166401 A1 Jun. 3, 2021

(30) Foreign Application Priority Data
Nov. 29, 2019 (CN) .......................... 201911204967.0

(51) Int. Cl.
*G06K 9/00* (2022.01)
*G06T 7/20* (2017.01)
(Continued)

(52) U.S. Cl.
CPC ................ *G06T 7/20* (2013.01); *G06F 1/329* (2013.01); *G06T 7/70* (2017.01); *G06T 7/97* (2017.01); *Y02D 10/00* (2018.01)

(58) Field of Classification Search
CPC ........... G06T 7/20; G06T 7/223; G06T 7/238; G06T 7/246; G06T 7/248; G06T 7/70;
(Continued)

(56) References Cited

U.S. PATENT DOCUMENTS 10,586,102 B2 * 3/2020 Ren .......................... G06T 7/246
11,010,905 B2 * 5/2021 Dehghan ................. G06T 7/248
(Continued)

FOREIGN PATENT DOCUMENTS

| CN | 1811821 A | 8/2006 |
| CN | 101986348 A | 3/2011 |

(Continued)

OTHER PUBLICATIONS

Extended European Search Report corresponding to European Patent Application No. 20173873.9, dated Oct. 20, 2020 (11 pages).
(Continued)

*Primary Examiner* — Eric Rush
(74) *Attorney, Agent, or Firm* — Maginot, Moore & Beck LLP

(57) ABSTRACT

A visual search method, a visual search device, and an electrical device are provided. The method includes determining a first object in a visual search process. A power consumption of the first object in the visual search process is greater than a power consumption of a second object in the visual search process. The first object includes at least one of a program and an algorithm and the second object includes at least one of a program and an algorithm. The method further includes performing a visual search through an optimized object of the first object. At least one of a calculating speed of the optimized object is greater than a calculating speed of the first object and a total calculating time of the optimized object within a unit time is less than a total calculating time of the first object within the unit time.

20 Claims, 2 Drawing Sheets

(51) Int. Cl.
*G06T 7/00* (2017.01)
*G06T 7/70* (2017.01)
*G06F 1/329* (2019.01)

(58) Field of Classification Search
CPC ............ G06T 7/97; G06T 2207/10016; G06T 2207/20004; G06T 2207/20012; G06F 1/32; G06F 1/3206; G06F 1/3228; G06F 1/3234; G06F 1/329; G06F 16/50; G06F 16/532; G06F 16/58; G06F 16/73; G06F 16/78; G06F 16/783; G06F 16/7837; G06F 16/786; G06F 16/901; Y02D 10/00; G06K 9/00993
USPC ....... 382/100, 103, 107, 155, 159, 165, 170, 382/181, 209, 217, 224, 282, 291; 348/143, 152, 155, 161, 169–172
See application file for complete search history.

(56) References Cited

U.S. PATENT DOCUMENTS

| | | | |
|---|---|---|---|
| 11,205,274 B2* | 12/2021 | Gao | G06V 10/454 |
| 2011/0043639 A1* | 2/2011 | Yokohata | H04N 5/23222 |
| | | | 348/169 |
| 2014/0376773 A1* | 12/2014 | Holz | G06K 9/00342 |
| | | | 382/103 |
| 2015/0178953 A1* | 6/2015 | Gao | G06T 7/70 |
| | | | 345/681 |
| 2016/0180197 A1* | 6/2016 | Kim | G01S 5/16 |
| | | | 382/103 |
| 2017/0004148 A1 | 1/2017 | Liu | |
| 2019/0304105 A1 | 10/2019 | Gao et al. | |
| 2020/0217952 A1* | 7/2020 | Rider | G06T 7/248 |
| 2021/0012511 A1 | 1/2021 | Zhang et al. | |
| 2021/0124881 A1* | 4/2021 | Li | G06F 40/30 |
| 2021/0201501 A1* | 7/2021 | Yuan | G06V 20/52 |
| 2022/0284298 A1* | 9/2022 | Tartaglione | G06N 3/0454 |

FOREIGN PATENT DOCUMENTS

| | | |
|---|---|---|
| CN | 104731784 A | 6/2015 |
| CN | 104915969 A | 9/2015 |
| CN | 105491336 A | 4/2016 |
| CN | 105718866 A | 6/2016 |
| CN | 106558064 A | 4/2017 |
| CN | 108282597 A | 7/2018 |
| CN | 108320301 A | 7/2018 |
| CN | 108961312 A | 12/2018 |
| CN | 109558505 A | 4/2019 |
| CN | 109978922 A | 7/2019 |
| CN | 110147750 A | 8/2019 |
| CN | 110349190 A | 10/2019 |
| CN | 110490905 A | 11/2019 |
| EP | 2770783 A2 | 8/2014 |
| JP | 2005309777 A | 11/2005 |
| WO | 2013167901 A1 | 11/2013 |
| WO | 2019127227 A1 | 7/2019 |
| WO | WO-2019127227 A1 * | 7/2019 ............ G06T 7/248 |

OTHER PUBLICATIONS

Berral, Josep LL. et al., "Toward Energy-Aware Scheduling Using Machine Learning," Energy-Efficient Distributed Computing Systems, First Edition, Chapter 8, pp. 215-244, Aug. 3, 2012 (30 pages).
Vrochidis, Stefanos et al., "Optimizing visual search with implicit user feedback in interactive video retrieval," Proceedings of the ACM International Conference on Image and Video Retrieval (CIVR'10), ACM, pp. 274-281, Jul. 5, 2010 (8 pages).
Liu, Wu et al., "Deep learning hashing for mobile visual search," Eurasip Journal on Image and Video Processing, vol. 2017, No. 1, p. 1-11, Feb. 21, 2017 (11 pages).
Machine Translation of CN105491336, dated Oct. 26, 2020 (7 pages).
Machine Translation of CN 105718866, dated Oct. 26, 2020 (9 pages).
Machine Translation of CN110147750, dated Oct. 14, 2020 (16 pages).
Machine Translation of 2005309777A, dated Jun. 19, 2021 (9 pages).
Japanese Office Action corresponding to Japanese Patent Application No. 2020-082447, dated Jun. 11, 2021 (4 pages).
Software Development [Game of Machine Learning Age besides Kentaro Iizuka—Application—/Infrastructure /] Edited by Edge, Japan, Incorporated Company Technical Hyoronsha, Aug. 22, 2019 Issue, pp. 90-91, and 119-131 (Document Newly Cited at the Body)—see explanation of relevance in English translation of Japanese Office Action submitted herewith.
Japanese Office Action corresponding to Japanese Patent Application No. 2020-082447, dated Sep. 5, 2022 (13 pages).
English Machine Translation of Japanese Office Action corresponding to Japanese Patent Application No. 2020-082447, dated Sep. 5, 2022 (11 pages).
Chinese Office Action corresponding to Chinese Patent Application No. 2019112049670, dated Dec. 23, 2022 40 Pages).
Machine English Translation of Chinese Office Action corresponding to Chinese Patent Application No. 2019112049670, dated Dec. 23, 2022. (5 Pages).
Machine English Translation of CN110490905A. (10 Pages).
Machine English Translation of CN110349190A. (38 Pages).
Machine English Translation of CN109978922A. (17 Pages).
Machine English Translation of Cn 108320301A. (47 Pages).
Machine English Translation of CN106558064A. (12 Pages).
Machine English Translation of CN104915969A. (20 Pages).
Machine English Translation of CN101986348A. (17 Pages).
Machine English Translation of CN 1811821 A. (15 Pages).
Machine English Translation of CN108282597A. (15 Pages).

* cited by examiner

VISUAL SEARCH METHOD, VISUAL SEARCH DEVICE AND ELECTRICAL DEVICE

CROSS-REFERENCE TO RELATED APPLICATIONS

This application claims priority under 35 U.S.C. § 119 to Chinese Patent Application No. 201911204967.0, filed on Nov. 29, 2019, the disclosure of which is incorporated herein by reference in its entirety.

TECHNICAL FIELD

The present disclosure relates to field of image processing, and in particular to a visual search method, a visual search device and an electrical device.

BACKGROUND

Visual search is a technology that taking visual contents such as image and video as a search input resource, recognizing and searching the input visual content through a visual recognizing technology, and outputting results such as the searched image and words. With the development of the visual recognition technology, more and more users are using the mobile terminal to search and recognize the surrounding objects through the visual searching technology.

However, the visual search is performed based on the visual contents such as images and videos, so the power consumption thereof is high.

SUMMARY

A visual search method, a visual search device and an electrical device are provided in the present disclosure, to reduce the power consumption of the visual search process.

In a first aspect, a visual search method is provided in the present disclosure, including: determining a first object in a visual search process, where a power consumption of the first object in the visual search process is greater than a power consumption of a second object in the visual search process, and the first object includes at least one of a program and an algorithm, the second object includes at least one of a program and an algorithm; performing a visual search through an optimized object of the first object, where a calculating speed of the optimized object is greater than a calculating speed of the first object, and/or a total calculating time of the optimized object within a unit time is less than a total calculating time of the first object within the unit time.

According to the above visual search method, firstly the first object whose power consumption is greater than the power consumption of the second object in the visual search process is determined, that is, the first object with the maximum power consumption in the visual search is determined. Then, the visual search is performed based on the optimized object of the first object. Because the calculating speed of the optimized object is greater than that of the first object, and/or the total calculating time of the optimized object within a unit time is less than the total calculating time of the first object within the unit time, it is able to improve the calculating speed of the visual search and/or reduce the calculating times during the visual search process, thereby reducing the power consumption.

Optionally, the optimized object includes an object obtained by optimizing a content of at least one of the program and the algorithm of the first object; or the optimized object includes an object obtained by optimizing a scheduling of at least one of the program and the algorithm of the first object; or the optimized object includes an object obtained by optimizing a content of at least one of the program and the algorithm of the first object and optimizing a scheduling of at least one of the program and the algorithm of the first object.

The optimized object may be an object obtained by optimizing a content of at least one of the program and the algorithm of the first object, or an object obtained by optimizing a scheduling of at least one of the program and the algorithm of the first object, or an object obtained by optimizing a content of at least one of the program and the algorithm of the first object and optimizing a scheduling of at least one of the program and the algorithm of the first object, therefore both a content optimizing and a scheduling optimizing may be achieved, thereby improving the speed of performing the visual search through the optimized object and/or reducing the calculating time and power consumption.

Optionally, the optimizing the scheduling of at least one of the program and the algorithm of the first object includes: reducing a scheduling frequency of at least one of the program and the algorithm of the first object.

The scheduling of the first object may be optimized by reducing a scheduling frequency of at least one of the program and the algorithm of the first object, and the total calculating time may be reduced by reducing the scheduling frequency, thereby reducing the power consumption.

Optionally, the first object includes a tracking algorithm, the optimized object includes an optimized tracking algorithm obtained by optimizing a scheduling of the tracking algorithm; the performing the visual search through the optimized object of the first object includes: acquiring an $i^{th}$ frame of image, where i is a positive integer; performing a target detection on the $i^{th}$ frame of image, to acquire a position of a target in the $i^{th}$ frame of image; performing a target tracking through the optimized tracking algorithm, where the optimized tracking algorithm is configured to perform the target tracking on a part of frames of image subsequent to the $i^{th}$ frame of image based on the position of the target in the $i^{th}$ frame of image.

The optimized tracking algorithm is applied to perform the tracking, thereby reducing the power consumption.

Optionally, the optimized object includes the optimized tracking algorithm obtained by optimizing the scheduling of the tracking algorithm based on a total pixel displacement of the $i^{th}$ frame of image and N prior frames of image, where the N prior frames of image are N frames of image acquired before an acquiring time of the $i^{th}$ frame of image, N is a positive integer.

The scheduling of the tracking algorithm is optimized through the total pixel displacement, the total pixel displacement of the $i^{th}$ frame of image and N prior frames of image may reflect the movement state within a period of time. The larger the total pixel displacement is, the higher the movement degree will be; the smaller the total pixel displacement is, the lower the movement degree will be.

Optionally, in the case that the total pixel displacement is less than a first preset displacement, the optimized tracking algorithm is configured to perform the target tracking on a first part of frames of image subsequent to the $i^{th}$ frame of image based on the position of the target in the $i^{th}$ frame of image; or in the case that the total pixel displacement is greater than or equal to a first preset displacement and less than a second preset displacement, the optimized tracking algorithm is configured to perform the target tracking on a second part of frames of image subsequent to the $i^{th}$ frame of image based on the position of the target in the $i^{th}$ frame of image; or in the case that the total pixel displacement is greater than or equal to a second preset displacement and less than a third preset displacement, the optimized tracking algorithm is configured to perform the target tracking on a third part of frames of image subsequent to the $i^{th}$ frame of image based on the position of the target in the $i^{th}$ frame of image; or in the case that the total pixel displacement is greater than or equal to a third preset displacement, the optimized tracking algorithm is configured to perform the target tracking on a fourth part of frames of image subsequent to the $i^{th}$ frame of image based on the position of the target in the $i^{th}$ frame of image; where the first preset displacement, the second preset displacement, the third preset displacement, the fourth preset displacement increase in turn, and frame numbers of the first part of frames of image, the second part of frames of image, the third part of frames of image, the fourth part of frames of image increase in turn.

According to the present disclosure, the tracking frequency is determined based on the range where the total pixel displacement is located, thereby tracking different numbers of image frames. That is, the larger the total pixel displacement is, the larger the movement degree will be and the higher the tracking frequency will be, and the more subsequent image frames will be tracked; the smaller the total pixel displacement is, the smaller the movement degree will be and the lower the tracking frequency will be, and the fewer subsequent image frames will be tracked. Therefore, the tracking deviation and tracking failure may be avoided and the power consumption may be reduced. As such, the tracking frequency is low in case of stable state, and the tracking frequency is high in case of movement state, thereby balancing the power consumption and the tracking.

In a second aspect, a visual search device is further provided in the present disclosure, including: an object determining module, configured to determine a first object in a visual search process, where a power consumption of the first object in the visual search process is greater than a power consumption of a second object in the visual search process, and the first object includes at least one of a program and an algorithm, the second object includes at least one of a program and an algorithm; and a searching module, configured to perform a visual search through an optimized object of the first object, where a calculating speed of the optimized object is greater than a calculating speed of the first object, and/or a total calculating time of the optimized object within a unit time is less than a total calculating time of the first object within the unit time.

Optionally, the optimized object includes an object obtained by optimizing a content of at least one of the program and the algorithm of the first object; or the optimized object includes an object obtained by optimizing a scheduling of at least one of the program and the algorithm of the first object; or the optimized object includes an object obtained by optimizing a content of at least one of the program and the algorithm of the first object and optimizing a scheduling of at least one of the program and the algorithm of the first object.

Optionally, the optimizing the scheduling of at least one of the program and the algorithm of the first object includes: reducing a scheduling frequency of at least one of the program and the algorithm of the first object.

Optionally, the first object includes a tracking algorithm, the optimized object includes an optimized tracking algorithm obtained by optimizing a scheduling of the tracking algorithm; the searching module includes: an image acquiring module, configured to acquire an $i^{th}$ frame of image, where i is a positive integer; a target detection module, configured to perform a target detection on the $i^{th}$ frame of image, to acquire a position of a target in the $i^{th}$ frame of image; a tracking module, configured to perform a target tracking through the optimized tracking algorithm, where the optimized tracking algorithm is configured to perform the target tracking on a part of frames of image subsequent to the $i^{th}$ frame of image based on the position of the target in the $i^{th}$ frame of image.

Optionally, the optimized object includes the optimized tracking algorithm obtained by optimizing the scheduling of the tracking algorithm based on a total pixel displacement of the $i^{th}$ frame of image and N prior frames of image, where the N prior frames of image are N frames of image acquired before an acquiring time of the $i^{th}$ frame of image, N is a positive integer.

Optionally, in the case that the total pixel displacement is less than a first preset displacement, the optimized tracking algorithm is configured to perform the target tracking on a first part of frames of image subsequent to the $i^{th}$ frame of image based on the position of the target in the $i^{th}$ frame of image; or in the case that the total pixel displacement is greater than or equal to a first preset displacement and less than a second preset displacement, the optimized tracking algorithm is configured to perform the target tracking on a second part of frames of image subsequent to the $i^{th}$ frame of image based on the position of the target in the $i^{th}$ frame of image; or in the case that the total pixel displacement is greater than or equal to a second preset displacement and less than a third preset displacement, the optimized tracking algorithm is configured to perform the target tracking on a third part of frames of image subsequent to the $i^{th}$ frame of image based on the position of the target in the $i^{th}$ frame of image; or in the case that the total pixel displacement is greater than or equal to a third preset displacement, the optimized tracking algorithm is configured to perform the target tracking on a fourth part of frames of image subsequent to the $i^{th}$ frame of image based on the position of the target in the $i^{th}$ frame of image; where the first preset displacement, the second preset displacement, the third preset displacement, the fourth preset displacement increase in turn, and frame numbers of the first part of frames of image, the second part of frames of image, the third part of frames of image, the fourth part of frames of image increase in turn.

In a third aspect, an electrical device is provided in the present disclosure, including: at least one processor; and a memory connected to and capable of communicating with the at least one processor; where the memory stores an instruction executable by the at least one processor, and the instruction is executed by the at least one processor to enable the at least one processor to perform the visual search method hereinabove.

In a fourth aspect, a non-instantaneous computer-readable storage medium storing a computer instruction is provided in the present disclosure, where the computer instruction is configured to enable a computer to perform the visual search method hereinabove.

BRIEF DESCRIPTION OF THE DRAWINGS

The drawings are merely for a better understanding of the present disclosure, instead of limiting the present disclosure.

DETAILED DESCRIPTION

In the following, the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by a person of ordinary skill in the art without creative efforts shall fall within the scope of the present disclosure.

Figure 1:
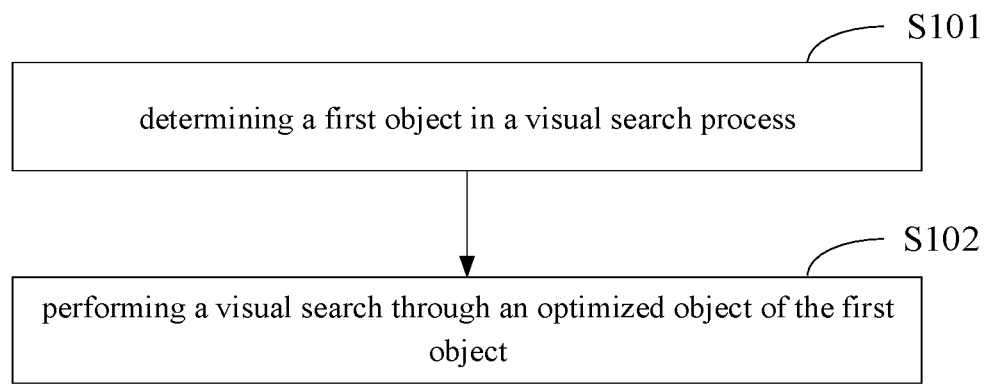
FIG. 1 is a flow chart of a visual search method in some embodiments of the present disclosure.

As shown in FIG. 1, a visual search method is provided in some embodiments of the present disclosure, which is applied to an electrical device such as mobile terminal. The method includes: S101: determining a first object in a visual search process.

Visual search is a technology that taking visual contents such as image and video as a search input resource, recognizing and searching the input visual content through a visual recognizing technology, and outputting results such as the searched image and words. A part of the process of the visual search may include a target detection, a target recognition and a target tracking, etc.

A power consumption of the first object in the visual search process is greater than a power consumption of a second object in the visual search process, where the first object includes at least one of a program and an algorithm, the second object includes at least one of a program and an algorithm.

The visual search relates to many programs and algorithms, and the electrical device needs power consumption when performing the programs and algorithms related to the visual search. According to the embodiments of the present disclosure, in order to reduce the power consumption, firstly the first object whose power consumption is greater than the power consumption of the second object in the visual search process is determined, that is, the first object with the maximum power consumption in the visual search is determined.

The method further includes: S102: performing a visual search through an optimized object of the first object.

A calculating speed of the optimized object is greater than a calculating speed of the first object, and/or a total calculating time of the optimized object within a unit time is less than a total calculating time of the first object within the unit time.

After the first object with a relatively high power consumption, the visual search is performed through an optimized object of the first object. The optimized object is a result of optimizing the first object. According to some embodiments, a calculating speed of the optimized object is greater than a calculating speed of the first object. By the optimized object for the visual search, it is able to improve the calculating speed of the visual search, thereby reducing the power consumption. The total calculating time of the optimized object within a unit time is less than the total calculating time of the first object within the unit time. By the optimized object for the visual search, it is able to reduce the calculating times of the visual search, thereby reducing the power consumption. In addition, the calculating speed of the optimized object may be greater than the calculating speed of the first object, and the total calculating time of the optimized object within a unit time may be less than the total calculating time of the first object within the unit time, so that by the optimized object for the visual search, it is able to improve the calculating speed of the visual search and reduce the calculating times of the visual search, thereby reducing the power consumption.

According to the above visual search method, firstly the first object whose power consumption is greater than the power consumption of the second object in the visual search process is determined, that is, the first object with the maximum power consumption in the visual search is determined. Then, the visual search is performed based on the optimized object of the first object. Because the calculating speed of the optimized object is greater than that of the first object, and/or the total calculating time of the optimized object within a unit time is less than the total calculating time of the first object within the unit time, it is able to improve the calculating speed of the visual search and/or reduce the calculating times during the visual search process, thereby reducing the power consumption.

In some embodiments of the present disclosure, the optimized object includes an object obtained by optimizing a content of at least one of the program and the algorithm of the first object; or the optimized object includes an object obtained by optimizing a scheduling of at least one of the program and the algorithm of the first object; or the optimized object includes an object obtained by optimizing a content of at least one of the program and the algorithm of the first object and optimizing a rescheduling of at least one of the program and the algorithm of the first object.

According to some embodiments of the present disclosure, the optimized object may be an object obtained by optimizing a content of at least one of the program and the algorithm of the first object. The program consists of program contents and the algorithm consists of algorithm contents. The optimizing of the content of the program may refer to optimizing the program content related to the program itself, and the optimizing of the content of the algorithm may refer to optimizing the algorithm content related to the algorithm itself. By optimizing the content, the operating speed may be improved and the power consumption may be reduced.

The optimized object may be an object obtained by optimizing a scheduling of at least one of the program and the algorithm of the first object. The scheduling of the program or the algorithm may refer to configure the program or the algorithm to execute. For example, for an algorithm A, the scheduling of the algorithm A refer to configure the algorithm A to execute, and then there may be an executing process of the algorithm A. The optimizing of the scheduling of the program or the algorithm may refer to rationalize the scheduling of the program or the algorithm. For example, the scheduling times of the program or the algorithm may be reduced, so as to avoid the overmuch scheduling of the program or the algorithm, thereby reducing the power consumption.

In addition, the optimized object may be an object obtained by optimizing a content of at least one of the program and the algorithm of the first object and optimizing a scheduling of at least one of the program and the algorithm of the first object, therefore both a content optimizing and a scheduling optimizing may be achieved, thereby improving the speed of performing the visual search through the optimized object and reducing the calculating time and power consumption.

In some embodiments of the present disclosure, the optimizing the content of at least one of the program and the algorithm of the first object includes: performing a network structure clipping or a knowledge distillation optimization on a deep learning model of at least one of the program and the algorithm of the first object.

That is, the first object includes a deep learning model, and the optimizing of the content may include performing a network structure clipping or a knowledge distillation optimization on the deep learning model, and the optimized object includes the deep learning model subjected to a network structure clipping or a knowledge distillation, so the structure of the deep learning model may be simplified and the number of the model parameters related to the deep learning model may be reduced, thereby reducing the calculating amount when performing the target detection through the optimized deep learning model, and improving the operating speed and reducing the power consumption. For example, the deep learning model may include a yolo model (i.e., an end-to-end target detection model).

In some embodiments of the present disclosure, the optimizing the scheduling of at least one of the program and the algorithm of the first object includes: reducing a scheduling frequency of at least one of the program and the algorithm of the first object.

The scheduling of the first object may be optimized by reducing a scheduling frequency of at least one of the program and the algorithm of the first object, and the total calculating time may be reduced by reducing the scheduling frequency, thereby reducing the power consumption.

In some embodiments of the present disclosure, a target detection may be performed on the $i^{th}$ frame of image and then a target area may be obtained. After obtaining the target area, the method may further include: performing a target recognition on the target area to obtain a recognition result; displaying the recognition result. The recognition result may be a category, etc. The recognition result may be displayed after obtaining the recognition result, so as to show it to the user. A network structure clipping or a knowledge distillation optimization is performed on a second deep learning model, so as to optimize a content of the second deep learning model. For example, the first object may include the second deep learning model (different from the deep learning model of performing the target detection), a target recognition may be performed on the target area through the second deep learning model to obtain a recognition result, so as to improve the recognition accuracy. For example, the second deep learning model may be a mobilenet model.

In some embodiments of the present disclosure, the first object includes a tracking algorithm, and the optimized object includes an optimized tracking algorithm obtained by optimizing a scheduling of the tracking algorithm.

In some embodiments of the present disclosure, the performing the visual search through the optimized object of the first object includes: acquiring an $i^{th}$ frame of image, where i is a positive integer; performing a target detection on the $i^{th}$ frame of image, to acquire a position of a target in the $i^{th}$ frame of image; performing a target tracking through the optimized tracking algorithm, where the optimized tracking algorithm is configured to perform the target tracking on a part of frames of image subsequent to the $i^{th}$ frame of image based on the position of the target in the $i^{th}$ frame of image.

During the visual search based on a video, the visual search is performed on the frame of images of the video. When the visual search is needed, a visual search application in an electrical device may be opened, and a camera may be turned on to capture the video. The $i^{th}$ frame of image is a first frame of image. After acquiring the $i^{th}$ frame of image, a target detection may be performed on the $i^{th}$ frame of image, and then a position of a target in the $i^{th}$ frame of image may be abstracted. A target detection may be performed on the $i^{th}$ frame of image through a target detection model, the target detection models are varied. For example, the target detection may be performed on the $i^{th}$ frame of image through a deep learning model. Then, a target tracking may be performed through an optimized tracking algorithm. The optimized tracking algorithm is configured to perform the target tracking on a part of frames of image subsequent to the $i^{th}$ frame of image based on the position of the target in the $i^{th}$ frame of image. Because the scheduling optimization is performed through the optimized tracking algorithm, the executing times of the tracking process is optimized. For example, the scheduling frequency of the tracking algorithm is optimized, i.e., reducing the scheduling frequency, thereby reducing the operating times of the algorithm and reducing the power consumption.

In some embodiments of the present disclosure, the optimized object includes the optimized tracking algorithm obtained by optimizing the scheduling of the tracking algorithm based on a total pixel displacement of the $i^{th}$ frame of image and N prior frames of image, where the N prior frames of image are N frames of image acquired before an acquiring time of the $i^{th}$ frame of image, N is a positive integer.

It may be understood that, the scheduling of the tracking algorithm is optimized through the total pixel displacement, the total pixel displacement of the $i^{th}$ frame image and N prior frames of image may reflect the movement state within a period of time. The larger the total pixel displacement is, the higher the movement degree will be. In order to avoid the tracking deviation and tracking failure, the scheduling may be optimized, so as to improve the scheduling frequency of the tracking algorithm, that is, more frames of image are tracked. The smaller the total pixel displacement is, the lower the movement degree will be, and the image is relatively stable. In order to reduce the power consumption, the scheduling may be optimized, so as to reduce the scheduling frequency of the tracking algorithm, that is, fewer frames of image are tracked. For example, N prior frames of image are N frames of image acquired before an acquiring time of the $i^{th}$ frame of image, so that it is able to determine the movement states of the image more accurately and then optimize the scheduling of the tracking algorithm more accurately.

For example, the total pixel displacement of the $i^{th}$ frame of image and N prior frames of image may refer to a sum of image pixel displacements each between two adjacent frames of image in the $i^{th}$ frame of image and N prior frames of image, the image pixel displacement between two adjacent frames of image may be a sum of displacements each between pixel points of the two adjacent frames of image respectively. Optionally, the image pixel displacement between two adjacent frames of image may be a sum of displacements each between target pixel points of the two adjacent frames of image respectively. The target pixel point may be an angular point of the target. Therefore, there is no need to calculate the displacement of each pixel point, thereby reducing the calculating amount and reducing the power consumption.

In some embodiments of the present disclosure, in the case that the total pixel displacement is less than a first preset displacement, the optimized tracking algorithm is configured to perform the target tracking on a first part of frames of image subsequent to the $i^{th}$ frame of image based on the position of the target in the $i^{th}$ frame of image; or in the case that the total pixel displacement is greater than or equal to a first preset displacement and less than a second preset displacement, the optimized tracking algorithm is configured to perform the target tracking on a second part of frames of image subsequent to the $i^{th}$ frame of image based on the position of the target in the $i^{th}$ frame of image; or in the case that the total pixel displacement is greater than or equal to a second preset displacement and less than a third preset displacement, the optimized tracking algorithm is configured to perform the target tracking on a third part of frames of image subsequent to the $i^{th}$ frame of image based on the position of the target in the $i^{th}$ frame of image; or in the case that the total pixel displacement is greater than or equal to a third preset displacement, the optimized tracking algorithm is configured to perform the target tracking on a fourth part of frames of image subsequent to the $i^{th}$ frame of image based on the position of the target in the $i^{th}$ frame of image; where the first preset displacement, the second preset displacement, the third preset displacement, the fourth preset displacement increase in turn, and frame numbers of the first part of frames of image, the second part of frames of image, the third part of frames of image, the fourth part of frames of image increase in turn.

According to the present disclosure, the tracking frequency is determined based on the range where the total pixel displacement is located, thereby tracking different numbers of image frames. That is, the larger the total pixel displacement is, the larger the movement degree will be and the higher the tracking frequency will be, and the more subsequent image frames will be tracked; the smaller the total pixel displacement is, the smaller the movement degree will be and the lower the tracking frequency will be, and the fewer subsequent image frames will be tracked. Therefore, the tracking deviation and tracking failure may be avoided and the power consumption may be reduced. As such, the tracking frequency is low in case of stable state, and the tracking frequency is high in case of movement state, thereby balancing the power consumption and the tracking.

After the total pixel displacement is determined, a tracking frequency coefficient, a re-tracking frequency coefficient and a present acquiring frequency of frames of image may be determined based on the total pixel displacement, then a first tracking frequency may be determined. That is, the first tracking frequency is related to the tracking frequency coefficient and the present acquiring frequency of frames of image, that is, the first tracking frequency is related to the total pixel displacement, so as to relate the tracking frequency with the displacement, thereby improving the accuracy of the tracking frequency. The greater the tracking frequency coefficient is, the greater the first tracking frequency will be. That is, the first tracking frequency is positively correlated with the tracking frequency coefficient.

In some embodiments of the present disclosure, the tracking algorithm may apply an LK optical flow method. LK optical flow method involves a slide window. When performing the tracking through the LK optical flow method, a size of the slide window influences the quantity of equation sets to be solved in the tracking process, thereby influencing the power consumption. In some embodiments of the present disclosure, the LK optical flow method is optimized to obtain an optimized LK optical flow method. The slide window in the optimized LK optical flow method is an empirical value, thereby reducing the power consumption.

The above tracking process may be illustrated by the following embodiments.

Firstly, the power consumption issue may include a GPU power consumption and a CPU power consumption, the power consumption optimization may include a GPU power consumption optimization and a CPU power consumption optimization. Specifically, the GPU power consumption optimization and the CPU power consumption optimization may be divided into optimizations of a power consumption of a single-time calculation and a total number of continuous calculations within a certain period of time. The quantization of power consumption may include: Power consumption within T period=GPU total power consumption+CPU total power consumption; GPU total power consumption within T period=power consumption of single-time GPU calculation*total times of GPU continuous calculation within T period; CPU total power consumption within T period=power consumption of single-time CPU calculation*total times of CPU continuous calculation within T period. In the above, "*" represents a times sign.

Firstly, the program and/or algorithm with a relative large power consumption in a real-time visual search is positioned. For each program and/or algorithm with a relative large power consumption, the following operation may be performed: optimizing the program and/or algorithm to improve the calculating speed of a single-time calculation; optimizing the scheduling of the program or algorithm, to reduce the total calculating times of program or algorithm within T period. The process specifically includes: 1) analyzing a program source code and using Xcode profile to position the program or algorithm of GPU, CPU calculating; 2) performing the following operations for the program or algorithm of GPU calculating: a) improving the calculating speed of a single-time calculation for the program or algorithm of GPU calculating; b) reducing the total calculating times of program or algorithm within T period for the program or algorithm of GPU calculating; 3) performing the following operations for the program or algorithm of CPU calculating: a) improving the calculating speed of a single-time calculation for the program or algorithm of CPU calculating; b) reducing the total calculating times of program or algorithm within T period for the program or algorithm of CPU calculating.

The following description is an example of target tracking in a visual search.

Firstly, by analyzing a program source code and using Xcode profile to perform an analysis, it is found that the deep learning algorithm such as target detection and target recognition run on GPU and the power consumption is high. The tracking algorithm running on the GPU has a high power consumption.

The following operations may be performed in advance on the target detection and target recognition algorithms of GPU calculating: reducing the number of parameters participating the calculating for a first deep learning model of target detection and a second deep learning model of target recognition, through a specific network structure clipping and knowledge distillation, and a multithreading parallel calculating is performed for the deep learning models, so as to improve the calculating speed of single-time calculation of the GPU.

A self-adaptive detection and recognition technology is applied to optimize the periodic scheduling of the deep learning model of target detection and recognition, so as to reduce the unnecessary target detection and recognition calculation. Specifically, a frame of image may be detected to determine whether a preset triggering condition is met. If yes, it is indicated that the image is stable, and the target detection and recognition may be performed. If no, it is indicated that the image is unstable, the target detection and recognition will not be performed on this frame of image. That is, the performing the target detection on the $i^{th}$ frame of image may include: in the case that the $i^{th}$ frame of image meets a present triggering condition, performing the target detection on the $i^{th}$ frame of image. For example, the triggering condition may include a time interval between a time of acquiring the $i^{th}$ frame of image and a time of performing a previous target detection exceeds a first preset time, which may refers to that the target detection may be performed every other first preset time length. Alternatively, the triggering condition may include that the displacement between the $i^{th}$ frame of image and the $(i-1)^{th}$ frame of image is less than a preset displacement threshold and the target detection is not performed on the $(i-1)^{th}$ frame of image. As such, it is able to avoid performing the target detection in an unstable state (i.e., the displacement is greater than or equal to a preset displacement threshold, which indicates that there is a movement and the state is unstable) and avoid performing multiple times of detection in the stable state, thereby reducing the times of detection and reducing the power consumption.

Performing the following operations for the tracking algorithm of CPU calculating: adjusting the slide window of the tracking calculation, to reduce the number of formula set needed to be solved, improve the calculating speed of single-time calculation. For example, the slide window may be adjusted to an empirical value.

For the reduction of the total tracking calculation time, the tracking method in the related art may make the image displacement between two frames of images to be too large. As a result, the tracking deviation and failure may occur. According to the present disclosure, the frequency is more reduced in case of stable state and less reduced in case of moving state, thereby balancing the power consumption and tracking effect.

To be specific, the current time point is t, the observation window for the image movement is k, within a [t−k, t] time interval, there are M frames of image within [t−k, t] time interval, and the total pixel displacement of the M frames of image is st. It may be understood that, in the case that the current frame of image is the $i^{th}$ frame of image, the M frames of image include the $i^{th}$ frame of image and N previous frames of image.

After the total pixel displacement is determined, a tracking frequency coefficient, a re-tracking frequency coefficient and a present acquiring frequency of frames of image may be determined based on the total pixel displacement, then a first tracking frequency may be determined. That is, the first tracking frequency is related to the tracking frequency coefficient and the present acquiring frequency of frames of image, that is, the first tracking frequency is related to the total pixel displacement, so as to relate the tracking frequency with the displacement, thereby improving the accuracy of the tracking frequency. The greater the tracking frequency coefficient is, the greater the first tracking frequency will be. That is, the first tracking frequency is positively correlated with the tracking frequency coefficient.

It may be understood that, st<α representing that the image is absolutely stable, α<=st<β representing that the image is relatively stable within the observation window, β<=st<γ representing that the image is relatively moving, γ<=st<θ representing that the image is moving quickly. α is a first preset displacement, β is a second preset displacement, γ is a third preset displacement, and θ is a fourth preset displacement.

It is detected that the image is stale, relatively stable, relatively moving and moving quickly within the observation window, then the tracking frequency coefficient a is used for processing, a∈{a1, a2, a3, a4}, where a1<a2<a3<a4, a1 is a first preset coefficient, a2 is a second preset coefficient, a3 is a third preset coefficient and a4 is a fourth preset coefficient. The first tracking frequency is image acquiring frequency of preset frames of image multiplying by tracking frequency coefficient a. Then, the target tracking may be performed based on the first tracking frequency, thereby reducing the tracking frequency and reducing the power consumption.

The frame number of the first part of frames of image is related to a1, the frame numbers of the second part of frames of image is related to a2, the frame numbers of the third part of frames of image is related to a3, and the frame numbers of the fourth part of frames of image is related to a4. The first preset coefficients acquired according to the above different tracking frequency coefficients are different from each other, then the first tracking frequencies are different from each other. The frame number of a part of frames of image is related to the first tracking frequency. The higher the first tracking frequency is, the larger the frame number of the part of frames of image will be.

In order to make the electrical device with different performances to have a better tracking effect, the above a1, a2, a3 and a4 may have different values on the electrical device with different performances. Taking low-performance electrical device X, a tracking calculating is performed on each frame of image input in 30 FPS in the real video, a throughput congestion of CPU may occur. As a result, the power consumption of CPU may increase and the tracking calculating frequency may be much lower than 30 FPS. Therefore, the frequency may be reduced, to reduce the number of frames tracked per second, thereby reducing the power consumption.

Figure 2:
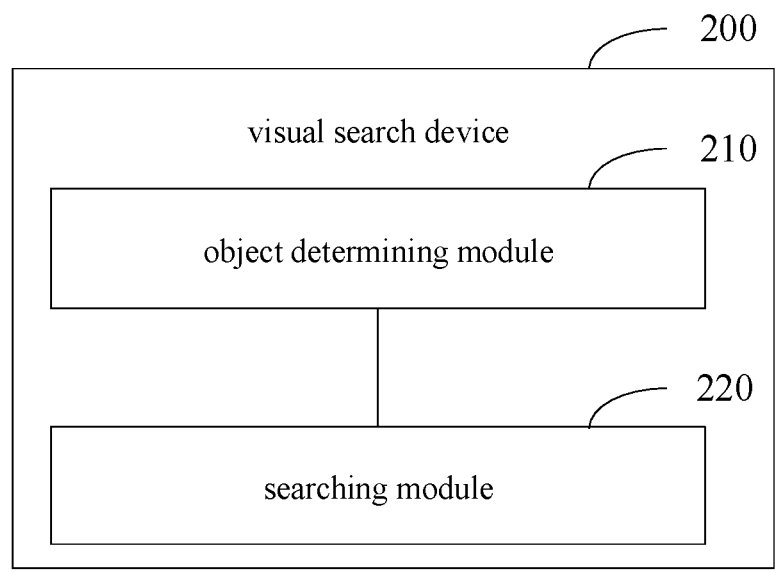
FIG. 2 is a first schematic view of a visual search device for performing the visual search method in some embodiments of the present disclosure.

As shown in FIG. 2, a visual search device 200 is further provided in some embodiments of the present disclosure, including: an object determining module 210, configured to determine a first object in a visual search process, where a power consumption of the first object in the visual search process is greater than a power consumption of a second object in the visual search process, and the first object includes at least one of a program and an algorithm, the second object includes at least one of a program and an algorithm; a searching module 220, configured to perform a visual search through an optimized object of the first object, where a calculating speed of the optimized object is greater than a calculating speed of the first object, and/or a total calculating time of the optimized object within a unit time is less than a total calculating time of the first object within the unit time.

In some embodiments of the present disclosure, the optimized object includes an object obtained by optimizing a content of at least one of the program and the algorithm of the first object; or the optimized object includes an object obtained by optimizing a scheduling of at least one of the program and the algorithm of the first object; or the optimized object includes an object obtained by optimizing a content of at least one of the program and the algorithm of the first object and optimizing a scheduling of at least one of the program and the algorithm of the first object.

In some embodiments of the present disclosure, the optimizing the scheduling of at least one of the program and the algorithm of the first object includes: reducing a scheduling frequency of at least one of the program and the algorithm of the first object.

Figure 3:
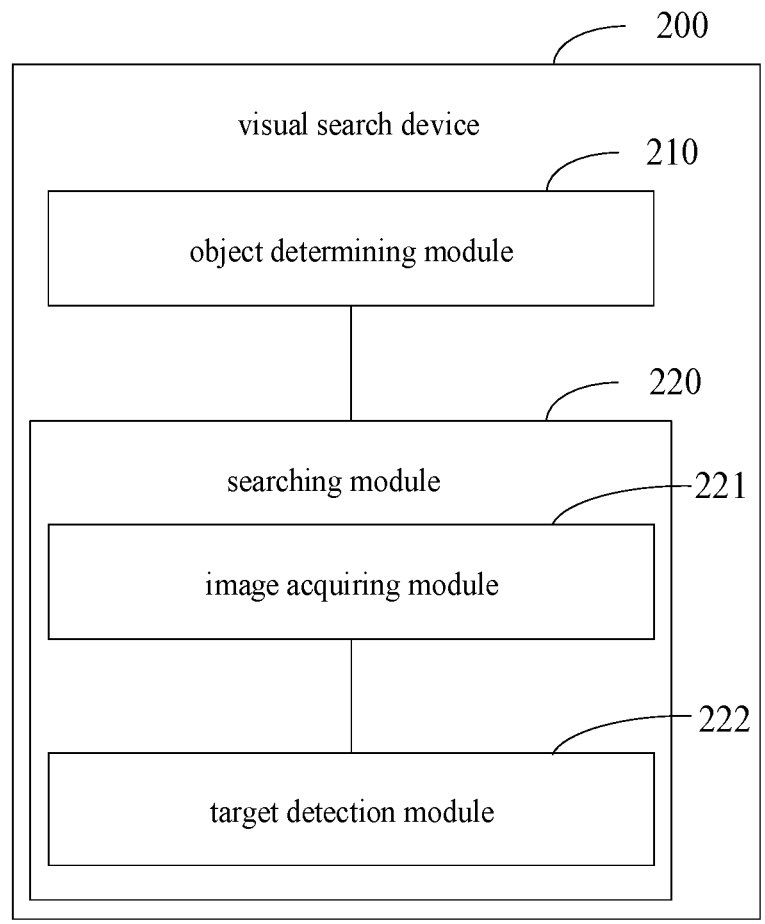
FIG. 3 is a second schematic view of a visual search device for performing the visual search method in some embodiments of the present disclosure.

As shown in FIG. 3, in some embodiments of the present disclosure, the first object includes a tracking algorithm, the optimized object includes an optimized tracking algorithm obtained by optimizing a scheduling of the tracking algorithm; the searching module 220 includes: an image acquiring module 221, configured to acquire an $i^{th}$ frame of image, where i is a positive integer; a target detection module 222, configured to perform a target detection on the $i^{th}$ frame of image, to acquire a position of a target in the $i^{th}$ frame of image; a tracking module 223, configured to perform a target tracking through the optimized tracking algorithm, where the optimized tracking algorithm is configured to perform the target tracking on a part of frames of image subsequent to the $i^{th}$ frame of image based on the position of the target in the $i^{th}$ frame of image.

In some embodiments of the present disclosure, the optimized object includes the optimized tracking algorithm obtained by optimizing the scheduling of the tracking algorithm based on a total pixel displacement of the $i^{th}$ frame of image and N prior frames of image, where the N prior frames of image are N frames of image acquired before an acquiring time of the $i^{th}$ frame of image, N is a positive integer.

In some embodiments of the present disclosure, in the case that the total pixel displacement is less than a first preset displacement, the optimized tracking algorithm is configured to perform the target tracking on a first part of frames of image subsequent to the $i^{th}$ frame of image based on the position of the target in the $i^{th}$ frame of image; or in the case that the total pixel displacement is greater than or equal to a first preset displacement and less than a second preset displacement, the optimized tracking algorithm is configured to perform the target tracking on a second part of frames of image subsequent to the $i^{th}$ frame of image based on the position of the target in the $i^{th}$ frame of image; or in the case that the total pixel displacement is greater than or equal to a second preset displacement and less than a third preset displacement, the optimized tracking algorithm is configured to perform the target tracking on a third part of frames of image subsequent to the $i^{th}$ frame of image based on the position of the target in the $i^{th}$ frame of image; or in the case that the total pixel displacement is greater than or equal to a third preset displacement, the optimized tracking algorithm is configured to perform the target tracking on a fourth part of frames of image subsequent to the $i^{th}$ frame of image based on the position of the target in the $i^{th}$ frame of image; where the first preset displacement, the second preset displacement, the third preset displacement, the fourth preset displacement increase in turn, and frame numbers of the first part of frames of image, the second part of frames of image, the third part of frames of image, the fourth part of frames of image increase in turn.

The visual search device in the above embodiments are applied to perform the visual search method in the above embodiments, and details thereof will be omitted herein.

An electrical device and a computer-readable storage medium are provided in some embodiments of the present disclosure.

Figure 4:
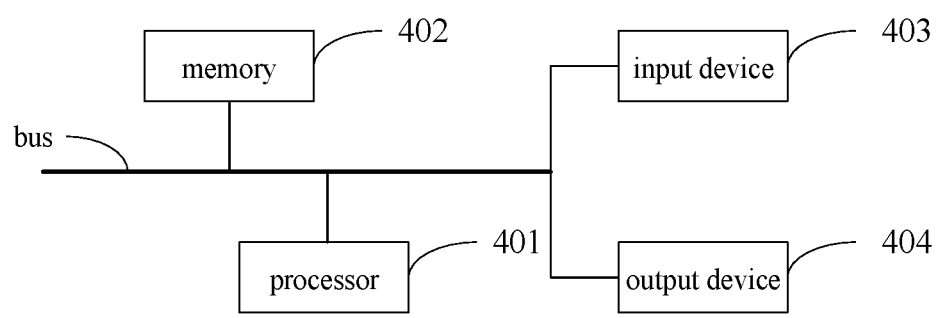
FIG. 4 is a schematic view of an electrical device for performing the visual search method in some embodiments of the present disclosure.

As shown in FIG. 4 which is a schematic view of an electrical device for performing the visual search method in some embodiments of the present disclosure. Electronic devices are designed to represent various forms of digital computers, such as laptops, desktop computers, workbench, personal digital assistants, servers, blade servers, mainframes, and other suitable computers. Electronic devices can also represent various forms of mobile devices, such as personal digital processing, cellular phones, smartphones, wearables and other similar computing devices. The parts, their connections and relationships shown in the present disclosure, and their functionality are examples only and are not intended to limit the implementation of the present disclosure as described and/or required in this article.

As shown in FIG. 4, the electronic device consists of one or more processors 401, memory 402, and interfaces for connecting components, including high-speed and low-speed interfaces. The components are connected to each other using different buses and can be installed on the public motherboard or otherwise as needed. The processor can process instructions executed in electronic devices, including those stored in memory to display graphic information about the GUI on external input/output devices such as display devices coupled to interfaces. In other embodiments, multiple processors and/or buses can be used with multiple memory and multiple memory if required. Similarly, multiple electronic devices can be connected, each providing some of the necessary operations (for example, as a server array, as a set of blade servers, or a multiprocessor system). FIG. 4 takes a processor 401 as an example.

Memory 402 is the non-instantaneous computer readable storage medium provided in the present disclosure. The memory stores instructions that can be executed by at least one processor so that at least one processor performs the visual search method provided in the present disclosure. The non-instantaneous computer readable storage media of the present disclosure stores the computer instruction, which is used to enable the computer to perform the visual search method provided in the present disclosure.

Memory 402 as a non-instantaneous computer readable storage media, can be used to store non-instantaneous software programs, non-instantaneous computer executable programs and modules, as in this application embodiment of the visual search method corresponding to the program instructions/modules (e.g., the object determining module 210 and the searching module 220 shown in FIG. 2). Processor 401 performs various functional applications and data processing of the server by running non-instantaneous software programs, instructions and modules stored in memory 402, i.e. realizes the visual search method in the above-mentioned method embodiment.

Memory 402 may include a storage program area and a storage data area, where the storage program area can store the operating system, at least one function required applications, the storage data store can store data created according to the use of electronic devices displayed on the keyboard, etc. In addition, the memory 402 may include high-speed random access memory, as well as non-instantaneous memory, such as at least one disk memory, flash memory, or other non-instantaneous solid state memory devices. In some embodiments, the memory 402 may include a memory sett remotely relative to the processor 401, which can be connected to the electronic device displayed on the keyboard via a network connection. Examples of the above-mentioned network include, but are not limited to, the Internet, intranet, local area network, mobile communication network and combinations thereof.

The electronic devices of the visual search method may also include: input device 403 and output device 404. Processor 401, memory 402, input device 403 and output device 404 can be connected by bus or other means, FIG. 4 is used as an example by bus connection.

The input unit 403 can receive input digital or character information, as well as key signal inputs related to the user settings and functional controls of electronic devices displayed on the keyboard, such as touch screens, key pads, mice, track pads, touchpads, indicator poles, one or more mouse buttons, trackballs, joysticks, etc. The output unit 404 may include display devices, auxiliary lighting devices (e.g., LEDs) and haptic feedback devices (e.g., vibratory motors). The display device may include, but is not limited to, liquid crystal displays (LCDs), light-emitting diode (LED) displays and plasma displays. In some embodiments, the display device can be a touch screen.

The various implementations of the systems and technologies described here can be implemented in digital electronic circuit systems, integrated circuit systems, dedicated ASICs (dedicated integrated circuits), computer hardware, firmware, software, and/or a combination of them. These can be implemented in one or more computer programs, one or more computer programs can be executed and/or interpreted on a programmable system that includes at least one programmable processor, which can be a dedicated or universal programmable processor that can receive data and instructions from a storage system, at least one input device, and at least one output device, and transmit data and instructions to the storage system, at least one input device, and at least one output device.

These computing programs (also known as programs, software, software applications, or code) include machine instructions for programmable processors and can be implemented using advanced processes and/or object-oriented programming languages, and/or assembly/machine languages. As used herein, the terms "machine-readable media" and "computer-readable media" refer to any computer program product, device, and/or device (e.g., disk, optical disc, memory, programmable logic device (PLD)) used to provide machine instructions and/or data to a programmable processor, including machine-readable media that receives machine instructions as machine readable signals. The term "machine readable signal" refers to any signal used to provide machine instructions and/or data to a programmable processor. To provide interaction with the user, the system and technology described here can be implemented on a computer that has: a display device (e.g., a CRT (cathode ray tube) or an LCD (LCD monitor) that displays information to the user, and a keyboard and pointing device (e.g., a mouse or trackball), The keyboard and the pointing device allow the user to provide input to the computer. Other types of devices can also be used to provide interaction with the user; for example, feedback to the user can be any form of sensing feedback (e.g., visual feedback, auditory feedback, or haptic feedback); and input from the user can be received in any form (including acoustic, voice, or tactile input).

The systems and technologies described here may be implemented in a computing system that includes background parts (for example, as a data server), or a computing system that includes middleware components (for example, application servers), or a computing system that includes front-end components (for example, a user computer with a graphical user interface or a web browser that allows users to interact with the system and technology described here through the graphical user interface or the web browser), or includes such background parts, middleware, or any combination of front-end components in a computing system. Components of a system can be connected to each other in any form or by digital data communication of the medium, such as a communication network. Examples of communication networks include a local area network (LAN), a wide area network (WAN), and the Internet.

A computer system can include clients and servers. Clients and servers are generally far away from each other and typically interact over a communications network. A client-server relationship is generated by computer programs that run on the appropriate computer and have client-server relationships with each other.

According to the embodiment of the present disclosure, the first sub-keyboard and the second sub-keyboard can be generated when the width of the electronic device is greater than the first preset width, and the interval shows the first sub-keyboard and the second sub-keyboard, that is, there is an interval between the first sub-keyboard and the second sub-keyboard, the user does not need to carry out key strokes in the interval, so that the user can easily touch the key in the keyboard during the operation, which can shorten the user's operating path to the keyboard, and thus improve the input efficiency.

It should be understood that it is able to reorder, add, or delete steps for the various forms of process shown above. For example, the steps in the present disclosure can be executed in parallel or sequentially or in different order, provided that the results expected of the technical scheme disclosed in the present disclosure can be achieved, which shall not be limited herein.

The above-mentioned embodiment does not limit the scope of the present disclosure. It should be clear to the skilled in the art that various modifications, combinations, subcombination, and substitutions can be made based on design requirements and other factors. Any modifications, equivalent replacements and improvements made within the principles of the present disclosure shall fall within the scope of the present disclosure.

What is claimed is:

1. A visual search method, comprising:
   determining a first object in a visual search process, wherein a power consumption of the first object in the visual search process is greater than a power consumption of a second object in the visual search process, and the first object comprises at least one of a program and an algorithm, the second object comprises at least one of a program and an algorithm; and
   performing a visual search through an optimized object of the first object;
   wherein the first object comprises a tracking algorithm, and the optimized object comprises an optimized tracking algorithm obtained by optimizing a scheduling of the tracking algorithm; and
   wherein performing the visual search through the optimized object of the first object comprises:
   acquiring an $i^{th}$ frame of image, wherein i is a positive integer,
   performing a target detection on the $i^{th}$ frame of image, to acquire a position of a target in the $i^{th}$ frame of image, and
   performing a target tracking with the optimized tracking algorithm comprising:
   performing, based on the position of the target in the $i^{th}$ frame of image, the target tracking on n frames of images from m frames of images subsequent to the $i^{th}$ frame of image without performing the target tracking and the target detection on the remaining (m−n) frames of images from the m frames of images, wherein m and n are both positive integers, and n is less than m;

wherein the optimized tracking algorithm is obtained by:

determining, based on a pixel displacement between the $i^{th}$ frame of image and each of N frames of image prior to the $i^{th}$ frame of image, a total pixel displacement;

selecting, based on the total pixel displacement, a tracking frequency coefficient from a tracking frequency coefficient set comprising a plurality of frequency coefficients;

determining, based on the tracking frequency coefficient and a present frequency for acquiring frames of image, a first tracking frequency on which the target tracking is performed; and optimizing the tracking algorithm with the first tracking frequency to obtain the optimized tracking algorithm;

wherein the first tracking frequency is equal to the present frequency multiplied by the tracking frequency coefficient, and the performing the target tracking with the optimized tracking algorithm comprises:

determining the n frames of images from the m frames of images subsequent to the $i^{th}$ frame of image based on the first tracking frequency, such that a ratio of n to m matches with the first tracking frequency.

2. The method according to claim 1, wherein:

the optimized object comprises an object obtained by optimizing a content of the at least one of the program and the algorithm of the first object; or the optimized object comprises an object obtained by optimizing a scheduling of the at least one of the program and the algorithm of the first object; or the optimized object comprises an object obtained by optimizing a content of the at least one of the program and the algorithm of the first object and optimizing a scheduling of the at least one of the program and the algorithm of the first object.

3. The method according to claim 2, wherein the optimizing the scheduling of the at least one of the program and the algorithm of the first object comprises:

reducing a scheduling frequency of at least one of the program and the algorithm of the first object.

4. The method according to claim 1, wherein the target detection is performed on the $i^{th}$ frame of image in a case that the $i^{th}$ frame of image satisfies a preset triggering condition, and wherein the preset triggering condition comprises a time interval between a time of acquiring the $i^{th}$ frame of image and a time of performing a previous target detection exceeds a first preset time, or a second total pixel displacement between the $i^{th}$ frame of image and an $(i-1)^{th}$ frame of image is less than a preset displacement threshold.

5. The method according to claim 1, wherein the tracking frequency coefficient set comprises a first frequency coefficient, a second frequency coefficient which is greater than the first frequency coefficient, a third frequency coefficient which is greater than the second frequency coefficient, and a fourth frequency coefficient which is greater than the third frequency coefficient, and the selecting, based on the total pixel displacement, the tracking frequency coefficient from the tracking frequency coefficient set comprising:

in a case that the total pixel displacement is less than a first preset displacement, selecting the first frequency coefficient as the tracking frequency coefficient;

in a case that the total pixel displacement is greater than or equal to the first preset displacement and less than a second preset displacement, selecting the second frequency coefficient as the tracking frequency coefficient;

in a case that the total pixel displacement is greater than or equal to the second preset displacement and less than a third preset displacement, selecting the third frequency coefficient as the tracking frequency coefficient; and in a case that the total pixel displacement is greater than or equal to the third preset displacement, selecting the fourth frequency coefficient as the tracking frequency coefficient.

6. The method according to claim 1, wherein the first object comprises a first deep learning model for the visual search process, and the optimized object of the first object comprises a second deep learning model obtained by performing a network structure clipping or a knowledge distillation optimization on the first deep learning model, wherein a number of model parameters in the second deep learning model is less than a number of model parameters in the first deep learning model, so that a calculating speed of the optimized object is greater than a calculating speed of the first object.

7. The method according to claim 1, wherein the tracking frequency coefficient set comprises at least four frequency coefficients.

8. A non-transitory computer-readable storage medium storing a computer instruction, wherein the computer instruction is configured to enable a computer to perform the visual search method according to claim 1.

9. The non-transitory computer-readable storage medium according to claim 8, wherein the tracking frequency coefficient set comprises at least four frequency coefficients.

10. The non-transitory computer-readable storage medium according to claim 8, wherein:

the optimized object comprises an object obtained by optimizing a content of the at least one of the program and the algorithm of the first object; or the optimized object comprises an object obtained by optimizing a scheduling of the at least one of the program and the algorithm of the first object; or the optimized object comprises an object obtained by optimizing a content of the at least one of the program and the algorithm of the first object and optimizing a scheduling of the at least one of the program and the algorithm of the first object.

11. The non-transitory computer-readable storage medium according to claim 10, wherein the optimizing the scheduling of the at least one of the program and the algorithm of the first object comprises:

reducing a scheduling frequency of at least one of the program and the algorithm of the first object.

12. The non-transitory computer-readable storage medium according to claim 8, wherein the target detection is performed on the $i^{th}$ frame of image in a case that the $i^{th}$ frame of image satisfies a preset triggering condition, and wherein the preset triggering condition comprises a time interval between a time of acquiring the $i^{th}$ frame of image and a time of performing a previous target detection exceeds a first preset time, or a second total pixel displacement between the $i^{th}$ frame of image and an $(i-1)^{th}$ frame of image is less than a preset displacement threshold.

13. The non-transitory computer-readable storage medium according to claim 8, wherein the tracking frequency coefficient set comprises a first frequency coefficient, a second frequency coefficient which is greater than the first frequency coefficient, a third frequency coefficient which is greater than the second frequency coefficient, and a fourth frequency coefficient which is greater than the third frequency coefficient, and the selecting, based on the total pixel displacement, the tracking frequency coefficient from the tracking frequency coefficient set comprising:
in a case that the total pixel displacement is less than a first preset displacement, selecting the first frequency coefficient as the tracking frequency coefficient;
in a case that the total pixel displacement is greater than or equal to the first preset displacement and less than a second preset displacement, selecting the second frequency coefficient as the tracking frequency coefficient;
in a case that the total pixel displacement is greater than or equal to the second preset displacement and less than a third preset displacement, selecting the third frequency coefficient as the tracking frequency coefficient; and
in a case that the total pixel displacement is greater than or equal to the third preset displacement, selecting the fourth frequency coefficient as the tracking frequency coefficient.

14. A visual search device, comprising:
at least one processor; and
a memory connected to and capable of communicating with the at least one processor;
wherein the memory stores an instruction executable by the at least one processor, and wherein the instruction is executed by the at least one processor to enable the at least one processor to perform the following steps:
determining a first object in a visual search process, wherein a power consumption of the first object in the visual search process is greater than a power consumption of a second object in the visual search process, and the first object comprises at least one of a program and an algorithm, the second object comprises at least one of a program and an algorithm; and
performing a visual search through an optimized object of the first object;
wherein the first object comprises a tracking algorithm, and the optimized object comprises an optimized tracking algorithm obtained by optimizing a scheduling of the tracking algorithm; and
wherein performing the visual search through the optimized object of the first object comprises:
acquiring an $i^{th}$ frame of image, wherein i is a positive integer,
performing, a target detection on the $i^{th}$ frame of image, to acquire a position of a target in the $i^{th}$ frame of image, and
performing a target tracking with the optimized tracking algorithm, comprising:
performing, based on the position of the target in the $i^{th}$ frame of image, the target tracking on n frames of images from m frames of images subsequent to the $i^{th}$ frame of image without performing the target tracking and the target detection on the remaining (m−n) frames of images from the m frames of images, wherein m and n are both positive integers, and n is less than m;

wherein the optimized tracking algorithm is obtained by:
determining, based on a pixel displacement between the $i^{th}$ frame of image and each of N frames of image prior to the $i^{th}$ frame of image, a total pixel displacement;
selecting, based on the total pixel displacement, a tracking frequency coefficient from a tracking frequency coefficient set comprising a plurality of frequency coefficients;
determining, based on the tracking frequency coefficient and a present frequency for acquiring frames of image, a first tracking frequency on which the target tracking is performed; and
optimizing the tracking algorithm with the first tracking frequency to obtain the optimized tracking algorithm;
wherein the first tracking frequency is equal to the present frequency multiplied by the tracking frequency coefficient, and the performing the target tracking with the optimized tracking algorithm comprises:
determining the n frames of images from the m frames of images subsequent to the $i^{th}$ frame of image based on the first tracking frequency, such that a ratio of n to m matches with the first tracking frequency.

15. The device according to claim 14, wherein:
the optimized object comprises an object obtained by optimizing a content of the at least one of the program and the algorithm of the first object; or
the optimized object comprises an object obtained by optimizing a scheduling of the at least one of the program and the algorithm of the first object; or
the optimized object comprises an object obtained by optimizing a content of the at least one of the program and the algorithm of the first object and optimizing a scheduling of the at least one of the program and the algorithm of the first object.

16. The device according to claim 15, wherein the optimizing the scheduling of the at least one of the program and the algorithm of the first object comprises:
reducing a scheduling frequency of at least one of the program and the algorithm of the first object.

17. The device according to claim 14, wherein the target detection is performed on the $i^{th}$ frame of image in a case that the $i^{th}$ frame of image satisfies a preset triggering condition, and
wherein the preset triggering condition comprises a time interval between a time of acquiring the $i^{th}$ frame of image and a time of performing a previous target detection exceeds a first preset time, or a second total pixel displacement between the $i^{th}$ frame of image and an $(i-1)^{th}$ frame of image is less than a preset displacement threshold.

18. The device according to claim 14, wherein the tracking frequency coefficient set comprises a first frequency coefficient, a second frequency coefficient which is greater than the first frequency coefficient, a third frequency coefficient which is greater than the second frequency coefficient, and a fourth frequency coefficient which is greater than the third frequency coefficient, and the selecting, based on the total pixel displacement, the tracking frequency coefficient from the tracking frequency coefficient set comprising:
in a case that the total pixel displacement is less than a first preset displacement, selecting the first frequency coefficient as the tracking frequency coefficient;
in a case that the total pixel displacement is greater than or equal to the first preset displacement and less than a second preset displacement, selecting the second frequency coefficient as the tracking frequency coefficient;

in a case that the total pixel displacement is greater than or equal to the second preset displacement and less than a third preset displacement, selecting the third frequency coefficient as the tracking frequency coefficient; and in a case that the total pixel displacement is greater than or equal to the third preset displacement, selecting the fourth frequency coefficient as the tracking frequency coefficient.

19. The device according to claim 14, wherein the first object comprises a first deep learning model for the visual search process, and the optimized object of the first object comprises a second deep learning model obtained by performing a network structure clipping or a knowledge distillation optimization on the first deep learning model, wherein a number of model parameters in the second deep learning model is less than a number of model parameters in the first deep learning model, so that a calculating speed of the optimized object is greater than a calculating speed of the first object.

20. The device according to claim 14, wherein the tracking frequency coefficient set comprises at least four frequency coefficients.

* * * * *